June 10, 1958     G. J. HUCKFELDT     2,838,405
METHOD FOR PRODUCING CURVED SAUSAGE CASINGS
Filed Aug. 18, 1953
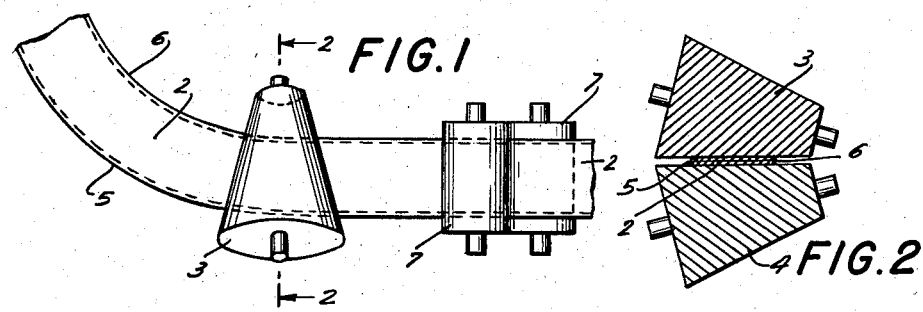
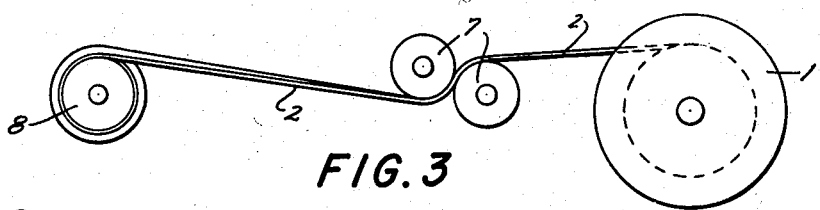
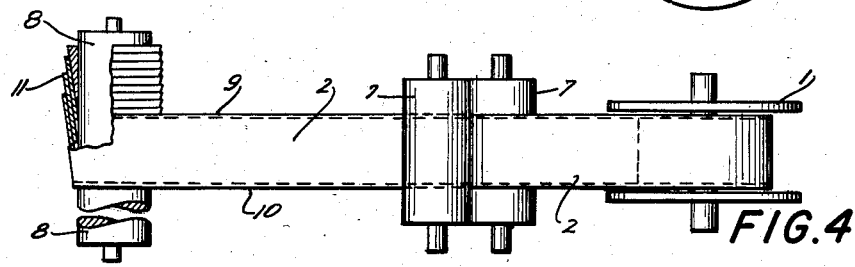
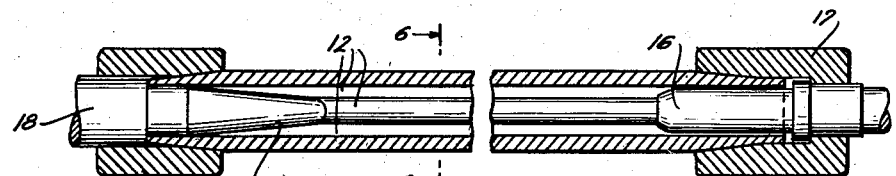
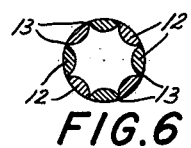
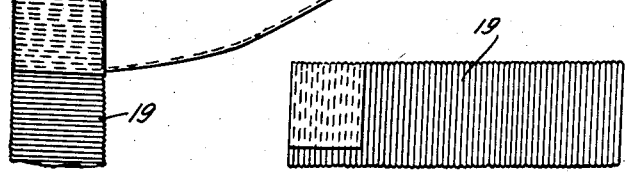
INVENTOR.
Gebhard Johannes Huckfeldt
BY Michael S. Striker
Attorney United States Patent Office 2,838,405
Patented June 10, 1958

2,838,405

METHOD FOR PRODUCING CURVED SAUSAGE CASINGS

Gebhard Johannes Huckfeldt, Uetersen, Germany

Application August 18, 1953, Serial No. 374,860

Claims priority, application Germany June 25, 1952

10 Claims. (Cl. 99—175)

The present invention relates to a method for producing curved tubes and more particularly to a method for producing curved sausage casings from a collapsed band-shaped tube consisting of a fibrous material of animal origin.

The present application is a continuation-in-part application of my co-pending application Serial No. 368,537, filed June 16, 1953, now abandoned.

For certain types of sausages it is customary to use sausage casings produced from curved animal intestines. The consumer is used to the curved shape of such sausages, and the sausage manufacturer finds slightly curved sausage casings to be advantageous, particularly for the production of frankfurter sausages and vienna sausages which are made on automatic filling and twisting machines. The slight curvature of the sausage casings prevents a turning of the divided sausages to their initial position, moreover small sausages of this type can be more easily suspended when curved.

According to the known methods of producing artificial curved sausage casings, a tubular casing is filled with air and is hardened in curved condition. Either the tubular casing is extruded in curved condition, or a straight extruded tube is wound on a suitable surface so as to be curved while inflated with air.

All the known methods have the disadvantage that the tubular sausage casing is coagulated, dried and treated while in inflated condition so that the apparatus for treating the inflated sausage casings is bulky and requires a great deal of space. Moreover, any damage to the inflated sausage casings causes a great loss.

It is known to produce straight sausage casings by extruding a fibrous material consisting of animal origin in the shape of a tube, and to collapse the tube to form a collapsed band-shaped tube consisting of two superimposed strip-shaped portions integrally connected along the edges thereof. Collapsed sausage casings of this type are deposited on a smooth surface, such as a drum, and then dried, hardened, washed and further treated. However, straight sausage casings of this type which are twisted and divided to form a string of frankfurters, tend to turn back after leaving the filling and twisting machine, and moreover have an unnatural straight appearance since the customer is accustomed to slightly curved frankfurter sausages.

It is the object of the present invention to overcome the disadvantages of the known art, and to provide a method for producing curved artificial sausage casings from a collapsed band-shaped tube.

It is another object of the present invention to stretch one longitudinal edge of a collapsed band-shaped tube consisting of two superimposed strip-shaped portions so that the collapsed tube is curved and retains its curvature in unfolded condition.

It is a further object of the present invention to stretch one longitudinal edge of a collapsed band-shaped tubular sausage casing consisting of a fibrous material of animal origin so as to produce a curved sausage casing while the material is in a deformable condition, and to harden the material afterwards so that the curved shape of the tubular sausage casing is retained in unfolded and filled condition.

It is a still further object of the present invention to stretch one longitudinal edge of a collapsed tube by winding the same on a surface having a larger diameter than the surface supporting the other longitudinal edge of the collapsed tube.

With these objects in view the present invention consists mainly in a method for producing a curved tube from a straight collapsed band-shaped tube consisting of a deformable material adapted to be hardened to a shape-retaining condition and being composed of two superimposed strip-shaped portions integrally connected along the longitudinal edges thereof, comprising the steps of stretching one longitudinal edge portion of the collapsed band-shaped tube extending along one of the longitudinal edges so as to form a curved collapsed band-shaped tube, and treating the curved collapsed band-shaped tube so as to harden the material thereof whereby said curved tube retains in unfolded condition the curved shape thereof.

A preferred method according to the present invention comprises the steps of winding the collapsed band-shaped tube helically and overlapping onto a mandrel whereby a tubular body is formed of the helically wound band-shaped tube, removing the mandrel, and further treating the tubular body by immersing it into a bath.

It has been found that a curved collapsed sausage casing produced by the method of the present invention retains after filling a curved shape resembling the natural shape of a curved animal intestine.

The curvature of the collapsed tube may be produced by stretching one longitudinal edge portion of a newly extruded and collapsed tubular sausage casing during the drying and hardening of the sausage casing. It is, however, possible to dry a collapsed artificial sausage casing produced by a known method, and to moisten the dried collapsed sausage casing again in order to swell the material and to put it into a deformable condition, in which condition the collapsed sausage casing is curved according to the method of the present invention, whereupon the curved collapsed sausage casing is coagulated or hardened to retain its curved shape permanently.

According to a known method a straight collapsed sausage casing consisting of a fibrous material of animal origin is wound on a drum before the hardening.

According to the present invention such collapsed tubular sausage casing is immersed into a sodium chloride solution which causes the collapsed sausage casing to absorb a predetermined amount of moisture for producing a swelling of 100–200% of its weight in dry condition. The swelled sausage casing is, for instance, helically wound on a cylindrical mandrel having a 30 mm. diameter and 600 mm. length in such manner that the windings overlap each other and one longitudinal edge of the collapsed band-shaped sausage casing is supported by the cylindrical surface of the mandrel, while the other longitudinal edge of the collapsed sausage casing is wound on previously wound windings having a larger diameter so that the last mentioned edge portion of the casing is stretched.

The sausage casing may now be hardened by immersion into a suitable liquid, and then washed and dried whereupon the dried curved sausage casing is wound off the mandrel. It is, however, also possible to first harden the sausage casing on the mandrel, and to wash and dry it after the sausage casing has been removed from the mandrel. The hardening may be also carried out after the sausage casing has been removed from the mandrel.

According to a preferred embodiment of the method according to the present invention, the hardening agent may be directly admixed to a moistening sodium chloride solution so that the collapsed tube hardens in curved condition on the mandrel, whereupon the further treatment is carried out with or without mandrel.

The following example is given as illustrative of a preferred method according to the present invention, the scope of the present invention not however being limited to the specific example.

A collapsed dried tubular sausage casing consisting of a swelled mass of fibers of animal origin which has been produced according to the method of the German Pat. No. 811,445 and has a diameter of 22–26 mm. (measured in expanded condition) a weight in dry condition of 1.3 to 1.8 gr./per meter, and a length of approximately 50 meters, is removed from the supporting surface on which it has been dried.

The collapsed band-shaped sausage casing is wound on a reel and the reel, with the collapsed sausage casing wound thereon, is immersed into an aqueous solution containing 20% sodium chloride to which a soluble salt such as sodium acetate, sodium bicarbonate or similar substances have been added in order to obtain a pH of 4–6, preferably 4.9 to 5. To the bath a hardening agent, for instance 1.5% formaldehyde is added. The hardening of the collapsed tube is preferably set in such manner that the hardening of the sausage casing is completed only after several hours substantially simultaneously with the drying of the swelled sausage casing. The delay of the completion of the hardening depends on the pH value of the bath. The higher the acidity of the bath is, the longer is the hardening delayed.

The amount of sodium chloride in the bath is preferably set in such manner that the dry sausage casing can absorb from the bath an amount of liquid which is approximately 100–200% of its own dry weight. In the above described example, this occurs after approximately 30 minutes.

The swelled moistened collapsed band-shaped tubular sausage casing is stretched along one longitudinal edge in accordance with the method of the present invention before the hardening is completed.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Fig. 1 is a plan view of the apparatus used for a preferred method according to the present invention;

Fig. 2 is a sectional view on line 2—2 in Fig. 1;

Fig. 3 is a side view of another embodiment of the apparatus according to the present invention;

Fig. 4 is a plan view of Fig. 3, partly in section;

Fig. 5 is a sectional view of a mandrel used in a method according to the present invention;

Fig. 6 is a cross-sectional view on line 6—6 in Fig. 5;

Fig. 7 is a tubular body consisting of a helically wound band-shaped sausage casing, partly unwound;

Fig. 8 is a tubular body consisting of a helically wound sausage casing ready for shipping; and Fig. 9 is an end view of a collapsed tubular body consisting of a helically wound band-shaped sausage casing.

Referring now to the drawings, and more particularly to Figs. 1 and 2, a collapsed tube 2 consisting of two superimposed strip-shaped portions which are integrally connected along the longitudinal edges 5 and 6 is unwound from a reel 1, see Fig. 3, guided between a pair of tensioning rollers 7, and passes between a pair of conical rollers 3, 4 whereby the edge portion extending along the longitudinal edge 5 is moved at a higher speed than the edge 6 and stretched so that the collapsed band-shaped tube 2 assumes a curved shape. The tension is adjusted by means of the roller pair 7. The curved band-shaped tube is then hardened, washed, and further treated so as to permanently retain its curved shape.

The method of the present invention may be also carried out by the apparatus shown in Figs. 3 and 4. The collapsed band-shaped tubular sausage casing is helically wound onto a mandrel 8 in such manner that the windings overlap and one longitudinal edge is wound on previously made windings, while the other longitudinal edge 10 is wound on the surface of the mandrel. Since the diameter of the surface of the mandrel is smaller than the diameter of the already wound windings, the longitudinal edge 9 is stretched, and the collapsed band-shaped tube 2 is curved.

If the initial windings are directly wound on a cylindrical mandrel, they are not curved in the same manner as the remainder of the collapsed band-shaped tube. Therefore, a conical ring 11 is preferably placed on the mandrel so that the initial windings of the collapsed band-shaped tube are curved to the same extent as the remainder of the collapsed tube having one longitudinal edge portion wound on the initial windings as shown in Fig. 4. The conical ring 11 preferably consists of rubber.

It will be understood that the curvature of the collapsed band-shaped tube depends on the diameter of the mandrel and on the number of windings per unit length of the mandrel. The curvature is increased when a greater number of windings per unit length is placed on the same mandrel. If the same number of windings is wound per unit length, a larger mandrel will produce a lesser curvature than a mandrel having a smaller diameter.

Preferably tensioning rollers 7 are provided between the reel 1 and the mandrel 8, and the tension of the band-shaped tube 2 is so adjusted that the stretching produced by the mandrel 8 is carried out at such tension that the band-shaped tube is neither damaged by too high a tension, nor insufficiently stretched. The mandrel 8 is moved in the direction of the arrow in Fig. 4 transversely to the longitudinal extension of the band-shape tube 2.

After the band-shaped tube has obtained its curved shape by being wound on the mandrel 8, it must be hardened, washed and dried. These steps can be carried out while the collapsed band-shaped tube is still on the mandrel. In this event, a great number of mandrels is required for the manufacturing process, and preferably the mandrel 8 is removed before further treatment of the sausage casing. It has been found that the tubular body consisting of overlapping helically wound windings of the band-shaped tubular casing is self-supporting and can be handled during the following hardening, drying and washing treatment. Consequently, the mandrel 8 can be immediately used again which is highly advantageous since a lesser number of mandrels is required for the manufacturing process.

Moreover, if the tubular body is immersed into a bath, the liquid contacts the inner and outer surfaces of the tubular body so that chemical treatment can be carried out in a very short time, and the sausage casing is reliably penetrated by the treating liquids. The same is true with respect to the washing of the sausage casing by which treating liquids are particularly reliably removed when there is no mandrel in the tubular body formed by the band-shaped tube.

It will be understood that an already hardened collapsed band-shaped sausage casing can be moistened and wound on a cylindrical mandrel and then removed in the shape of a tubular body for further treatment. The unfolded tube retains the curved shape only as long as it is dry. A tubular body consisting of a helically overlapping band-shaped sausage casing (as shown in Fig. 8) is so rigid and shape retaining that it can be flattened (as shown in Fig. 9) so that a number of such tubular collapsed bodies consisting of helically wound band-shaped sausage casings may be packed and shipped together, requiring little space.

The consumer places the tubular body on a suitable mandrel, and pulls off the helically wound curved windings 19 as shown in Fig. 7, using only one hand to place the tubular sausage casing end 20 onto the filling pipe of a sausage filling machine. Preferably the filling pipe is closed by a rounded wooden pin before the sausage casing is placed thereon, in order to prevent damage to the sausage casing. The pin is removed before the filling starts.

In order to keep the shipped sausage casings in good condition for a long time, it is advantageous to moisten the sausage casings before packing for shipping or to apply glycerin to the same, and to ship the sausage casings in air tight and moisture tight wrappings. In the event that the sausage casings are packed directly after the manufacturing process, the final drying is discontinued when sausage casing contains 10%–25% moisture, preferably 15%–20% moisture, and the sausage casings are air tightly wrapped in this condition.

The mandrel used in the method of the present invention is preferably hollow and consists of a plurality of separable elongated segments permitting easy removal of the mandrel from the tubular body formed by the sausage casing.

As shown in Figs. 5 and 6, the mandrel consists of eight longitudinally extending segments 12 abutting against each other along very small abutting faces 13 which are inwardly rounded off. The segments 12 are inserted into an annular member 14 which is seated on the winding machine, and onto a pointed conical pin 15. After the ends of members 12 are in place, a cylindrical rod 16 is inserted into the opening at the other end of the mandrel and secured by a threaded member 17. After the helical winding of the collapsed band-shaped tube has been completed, the member 17 is screwed off, the rod 16 pulled out, and the members 12 taken out of the tubular body formed by the collapsed band-shaped tube.

It will be understood that each of the elements described above, or two or more together, may also find a useful application in other types of methods for producing curved tubes differing from the types described above.

While the invention has been illustrated and described as embodied in a curved sausage casing from a collapsed band-shaped tube consisting of fibrous material of animal origin, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method for producing curved sausage casings from a collapsed band-shaped tube consisting of a deformable and stretchable fibrous material of animal origin and composed of two superimposed strip-shaped layers integrally connected along the longitudinal edges thereof, in combination, the step of stretching one longitudinal edge portion of the collapsed band-shaped tube consisting of two superimposed layer portions and extending along one of said longitudinal edges to be longer than the other longitudinal edge portion so as to form a curved collapsed band-shaped tube which in unfolded condition is a curved tubular sausage casing.

2. In a method for producing curved sausage casings from a collapsed band-shaped tube consisting of a deformable and stretchable fibrous material of animal origin and composed of two superimposed strip-shaped layers integrally connected along the longitudinal edges thereof, in combination, the step of moving one longitudinal edge portion of the collapsed band-shaped tube consisting of two superimposed layer portions and extending along one of said longitudinal edges at a higher speed than the other longitudinal edge portion for stretching said one longitudinal edge portion to be longer than the other longitudinal edge portion so as to form a curved collapsed band-shaped tube which in unfolded condition is a curved tubular sausage casing.

3. In a method for producing curved sausage casings from a collapsed band-shape tube consisting of a deformable and stretchable fibrous material of animal origin and composed of two superimposed strip-shaped layers integrally connected along the longitudinal edges thereof, in combination, the step of winding one longitudinal edge portion of the collapsed band-shaped tube consisting of two superimposed layer portions and extending along one of said longitudinal edges to a greater diameter than the other longitudinal edge portion for stretching said one longitudinal edge portion to be longer than the other longitudinal edge portion so as to form a curved collapsed band-shaped tube which in unfolded condition is a curved tubular sausage casing.

4. In a method for producing curved sausage casings from a collapsed band-shaped tube consisting of a deformable and stretchable fibrous material of animal origin and composed of two superimposed strip-shaped layers integrally connected along the longitudinal edges thereof, said material being adapted to be hardened to a shape-retaining condition, in combination, the steps of stretching one longitudinal edge portion of the collapsed band-shaped tube consisting of two superimposed layer portions and extending along one of said longitudinal edges to be longer than the other longitudinal edge portion; and hardening said collapsed band-shaped tube to a shape-retaining condition so that a shape-retaining curved collapsed band-shaped tube is formed which in unfolded condition is a curved tubular sausage casing.

5. In a method for producing curved sausage casings from a collapsed band-shaped tube consisting of a dry fibrous material of animal origin and composed of two superimposed strip-shaped layers integrally connected along the longitudinal edges thereof, in combination, the steps of moistening said collapsed band-shaped tube so as to make the same deformable and stretchable; and stretching one longitudinal edge portion of the collapsed band-shaped tube consisting of two superimposed layer portions and extending along one of said longitudinal edges to be longer than the other longitudinal edge portion so as to form a curved collapsed band-shaped tube; and drying said collapsed band-shaped tube to a shape-retaining condition so that said tube in unfolded condition is a shape-retaining curved tubular sausage casing.

6. In a method for producing curved sausage casings from a collapsed band-shaped tube consisting of a deformable and stretchable fifrous material of animal origin and composed of two superimposed strip-shaped layers integrally connected along the longitudinal edges thereof, in combination, the steps of winding said collapsed band-shaped tube helically and overlapping whereby a tubular body is formed of said helically wound band-shaped tube and one longitudinal edge of said band-shaped tube is stretched to be longer than the other longitudinal edge of said band-shaped tube; and unwinding said band-shaped tube whereby a curved collapsed band-shaped tube is obtained which in unfolded condition is a curved tubular sausage casing.

7. In a method for producing curved sausage casings from a collapsed band-shaped tube consisting of a dry fibrous material of animal origin and being composed of two superimposed strip-shaped layers integrally connected along the longitudinal edges thereof, in combination, the steps of moistening said collapsed band-shaped tube so as to make it deformable and stretchable; and winding said collapsed band-shaped tube helically and overlapping whereby a tubular body is formed of said helically wound band-shaped tube and one longitudinal edge of said band-shaped tube is stretched to be longer than the other longitudinal edge of said band-shaped tube; drying said tubular body whereby said collapsed band-shaped tube achieves a shape-retaining condition; and unwinding said band-shaped tube whereby a curved collapsed band-shape tube is obtained which in unfolded condition is a curved tubular sausage casing.

8. A method as set forth in claim 7 wherein said tubular body is only partly dried to retain a moisture content of 15 to 20%; and including the step of airtightly wrapping said tubular body for shipment before said band-shaped tube is unwound.

9. In a method for producing curved sausage casings from a collapsed band-shaped tube consisting of a deformable and stretchable fibrous material of animal origin and composed of two superimposed strip-shaped layers integrally connected along the longitudinal edges thereof, in combination, the steps of immersing said band-shaped tube into an aqueous solution containing 20% sodium chloride, 1.5% formaldehyde, and at least one other non-toxic soluble salt in an amount sufficient to effect a pH between 4 and 6; stretching one longitudinal edge portion of the collapsed band-shaped tube consisting of two superimposed layer portions and extending along one of said longitudinal edges to be longer than the other longitudinal edge portion thereof so as to form a curved collapsed band-shaped tube which is hardened to a shape-retaining non-deformable condition by said aqueous solution after having been stretched and curved so that the shape retaining curved collapsed band-shaped tube in unfolded condition is a curved tubular sausage casing.

10. In a method for producing curved sausage casings from a collapsed band-shaped tube consisting of a deformable and stretchable fibrous material of animal origin and composed of two superimposed strip-shaped layers integrally connected along the longitudinal edges thereof, in combination, the steps of immersing said band-shaped tube into an aqueous solution containing 20% sodium chloride, and at least one other non-toxic soluble salt in an amount sufficient to effect a pH between 4 and 6; stretching one longitudinal edge portion of the collapsed band-shaped tube consisting of two superimposed layer portions and extending along one of said longitudinal edges to be longer than the other longitudinal edge portion thereof so as to form a curved collapsed band-shaped tube; and hardening said curved collapsed band-shaped tube in a solution of 1.5% formaldehyde for hardening said collapsed band-shaped tube to a shape-retaining non-deformable condition so that the shape-retaining curved collapsed band-shaped tube in unfolded condition is a curved tubular sausage casing.

References Cited in the file of this patent
UNITED STATES PATENTS

| | | |
|---|---|---|
| 1,484,523 | Mumm et al. | Feb. 19, 1924 |
| 1,488,698 | Mumm et al. | Apr. 1, 1924 |
| 2,246,236 | Becker | June 17, 1941 |